(12) United States Patent
Ishihara et al.

(10) Patent No.: US 8,035,678 B2
(45) Date of Patent: Oct. 11, 2011

(54) LIGHT SCANNING APPARATUS AND SCANNING TYPE IMAGE DISPLAY APPARATUS

(75) Inventors: Keiichiro Ishihara, Yokohama (JP); Takashi Urakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1065 days.

(21) Appl. No.: 11/837,479

(22) Filed: Aug. 10, 2007

(65) Prior Publication Data

US 2008/0049095 A1   Feb. 28, 2008

(30) Foreign Application Priority Data

Aug. 24, 2006   (JP) ................ 2006-227504

(51) Int. Cl.
*B41J 15/14*   (2006.01)
*B41J 27/00*   (2006.01)
*H04N 3/08*   (2006.01)

(52) U.S. Cl. .......... 347/243; 347/259; 348/205

(58) Field of Classification Search ........... 347/235, 347/241–244, 256–261, 224–225, 231, 234, 347/248–250; 359/197.1–199.2, 201.1–203.1; 348/195, 203, 205
See application file for complete search history.

(56) References Cited

U.S. PATENT DOCUMENTS

| | | | | |
|---|---|---|---|---|
| 5,185,676 A | * | 2/1993 | Nishiberi | 359/202.1 |
| 6,317,244 B1 | | 11/2001 | Ishibe | 359/204 |
| 6,937,372 B2 | * | 8/2005 | Kandori et al. | 359/198.1 |
| 7,119,824 B2 | * | 10/2006 | Ishibe | 347/235 |
| 7,149,017 B2 | * | 12/2006 | Kandori et al. | 359/202.1 |
| 7,508,407 B2 | * | 3/2009 | Toyama et al. | 347/231 |

FOREIGN PATENT DOCUMENTS

| | | |
|---|---|---|
| JP | 4-184411 | 7/1992 |
| JP | 9-101472 | 4/1997 |
| JP | 2005-164997 | 6/2005 |
| JP | 2005-242036 | 9/2005 |
| JP | 2005-292845 | 10/2005 |

OTHER PUBLICATIONS

U.S. Appl. No. 11/837,480, filed Aug. 10, 2007 by Takashi Urakawa and Keiichiro Ishihara, pending.

* cited by examiner

*Primary Examiner* — Hai C Pham
(74) *Attorney, Agent, or Firm* — Fitzpatrick, Cella, Harper & Scinto

(57) ABSTRACT

A compact light scanning apparatus is disclosed which can provide a high light scanning efficiency. The apparatus includes a scanner that scans a light beam from a light source to form an image in an effective scan area, and a light detector that detects light. The light scanning apparatus includes a light-introducing member that introduces a partial light beam component of the light beam within its light beam width to the light detector in a state in which the light beam scanned by the scanner proceeds toward outside the effective scan area.

8 Claims, 8 Drawing Sheets

LIGHT SCANNING APPARATUS AND SCANNING TYPE IMAGE DISPLAY APPARATUS

BACKGROUND OF THE INVENTION

The present invention relates to a light scanning apparatus that scans a light beam from a light source to form an image, and a scanning type image display apparatus using the same.

Light scanning apparatuses scan a light beam from a light source through reflection and deflection by a scanning device (deflector), and draw an image on a scanned surface. Such light scanning apparatuses often include a light detector that detects the scanned light beam with a light-receiving element. Light detectors include a synchronous detector as a representative one. Besides, the light detectors include a radiation position detector, an amplitude sensor, and the like.

A light beam deflected (scanned) by the scanning device is reflected by a synchronous detecting mirror to be introduced to the synchronous detector. The synchronous detector is constituted by a slit and a light-receiving element. When a spot of the light beam (detection light) reflected by the mirror crosses the slit, the synchronous detector receives by the light-receiving element the detection light which has passed through the slit so as to detect a scanning timing. The adjustment of a light emitting timing of the light source relative to the scanning timing enables aligning of image-drawing start positions.

As the detection light, out of the light beam that is being scanned, used is a light beam proceeding toward a non-effective scan area existing outside an effective scan area (image-forming area) in which an image to be drawn on the scanned surface is formed. This light beam is deflected to the outermost side of a scanned range thereof. Thus, a deflection angle of the detection light is a major factor in determining the maximum deflection angle (amplitude) of the scanning device and the size of the light scanning apparatus.

Light scanning apparatuses miniaturized by characterizing the configuration of a synchronous detecting optical system include the following disclosed apparatuses.

Japanese Patent Laid-Open No. 4-184411 has disclosed a light scanning apparatus miniaturized by devising the disposition of the synchronous detector. More specifically, the light scanning apparatus uses an axial deflector including one mirror surface as the scanning device to dispose the synchronous detector at a position where a light beam deflected by the deflector is directly received, thereby integrating an fθ lens with the deflector.

Japanese Patent Laid-Open No. 9-101472 has disclosed a light scanning apparatus miniaturized by devising a scanning lens. More specifically, a marginal portion of the scanning lens, through which a light beam proceeding toward outside the effective scan area passes, is formed with a detection-light deflecting portion having a refractive index discontinuous to that of a portion through which the light beam proceeding toward the effective scan area passes. The detection light deflected outwardly of the scanning lens by the detection-light deflecting portion is received by a synchronous-detecting-light-receiving sensor provided after the detection-light deflecting portion. Thereby, a scanning position of a main scanning direction is detected.

Japanese Patent Laid-Open No. 2005-164997 has disclosed a light scanning apparatus in which a synchronous detecting mirror is disposed in the vicinity of the scanning device. Between the scanning device and a light separating means, the synchronous detecting mirror that folds part of an optical path therebetween is provided, and a plurality of light beams along the folded optical path are received by a synchronous sensor to perform synchronous detection.

However, in the light scanning apparatus disclosed in the Japanese Patent Laid-Open No. 4-184411, the maximum deflection angle of the deflector needs to be set larger than the normal case, which deteriorates scanning efficiency. The reason for this is that, to provide the synchronous detector in the vicinity of the deflector, the light beam used for the synchronous detection needs to be separated from the light beam proceeding toward the effective scan area on the scanned surface by at least the size of the synchronous detector. As a result, the non-effective scan area is expanded, and thus a ratio of the effective scan area decreases. That is, the scanning efficiency decreases, and the illuminance of an image surface also decreases.

In the light scanning apparatus disclosed in Japanese Patent Laid-Open No. 9-101472, the marginal portion of the scanning lens is used to further outwardly deflect the detection light. Thus, the synchronous detecting sensor is disposed in a position outwardly separated from the scanning lens. This makes it difficult to sufficiently reduce the size of the light scanning apparatus.

The light scanning apparatus disclosed in Japanese Patent Laid-Open No. 2005-164997 uses the synchronous detecting mirror that folds the optical path of the detection light from the scanning device. However, the folding mirror is provided in a light proceeding direction at a position where the entire width of the light beam as the detection light does not overlap the optical path of the light beam proceeding toward the effective scan area. This necessitates an increase of the maximum deflection angle of the scanning device. As a result, similar to the apparatus disclosed in the Japanese Patent Laid-Open No. 4-184411, there occurs a problem in that the scanning efficiency decreases, for example.

BRIEF SUMMARY OF THE INVENTION

The present invention provides a compact light scanning apparatus which can provide a high light scanning efficiency, and a compact scanning type image display apparatus provided therewith. The present invention also provides a light scanning apparatus and a scanning type image display apparatus which are capable of stably performing light detection even when there is an assembly error.

A light scanning apparatus as one aspect of the present invention includes a scanner that scans a light beam from a light source to form an image in an effective scan area, and a light detector that detects light. The light scanning apparatus includes a light-introducing member that introduces a partial light beam component of the light beam within its light beam width to the light detector in a state in which the light beam scanned by the scanner proceeds toward outside the effective scan area.

A light scanning apparatus as another aspect of the present invention includes a scanner that scans a light beam from a light source to form an image in an effective scan area, a light detector that detects light, and a light-introducing member that introduces the light beam to the light detector in a state in which the light beam scanned by the scanner proceeds toward outside the effective scan area. The light scanning apparatus includes a light-detection optical system that optically conjugates the light-introducing member with the light detector.

The present invention provides as still another aspect a scanning type image display apparatus and an image display system which include the light scanning apparatus.

Other objects and features of the present invention will become apparent from the following description and the attached drawings.

DETAILED DESCRIPTION OF THE PREFERRED EMBODIMENTS

Referring now to the accompanying drawings, description will be given of preferred embodiments of the present invention.

First Embodiment

Figure 1:
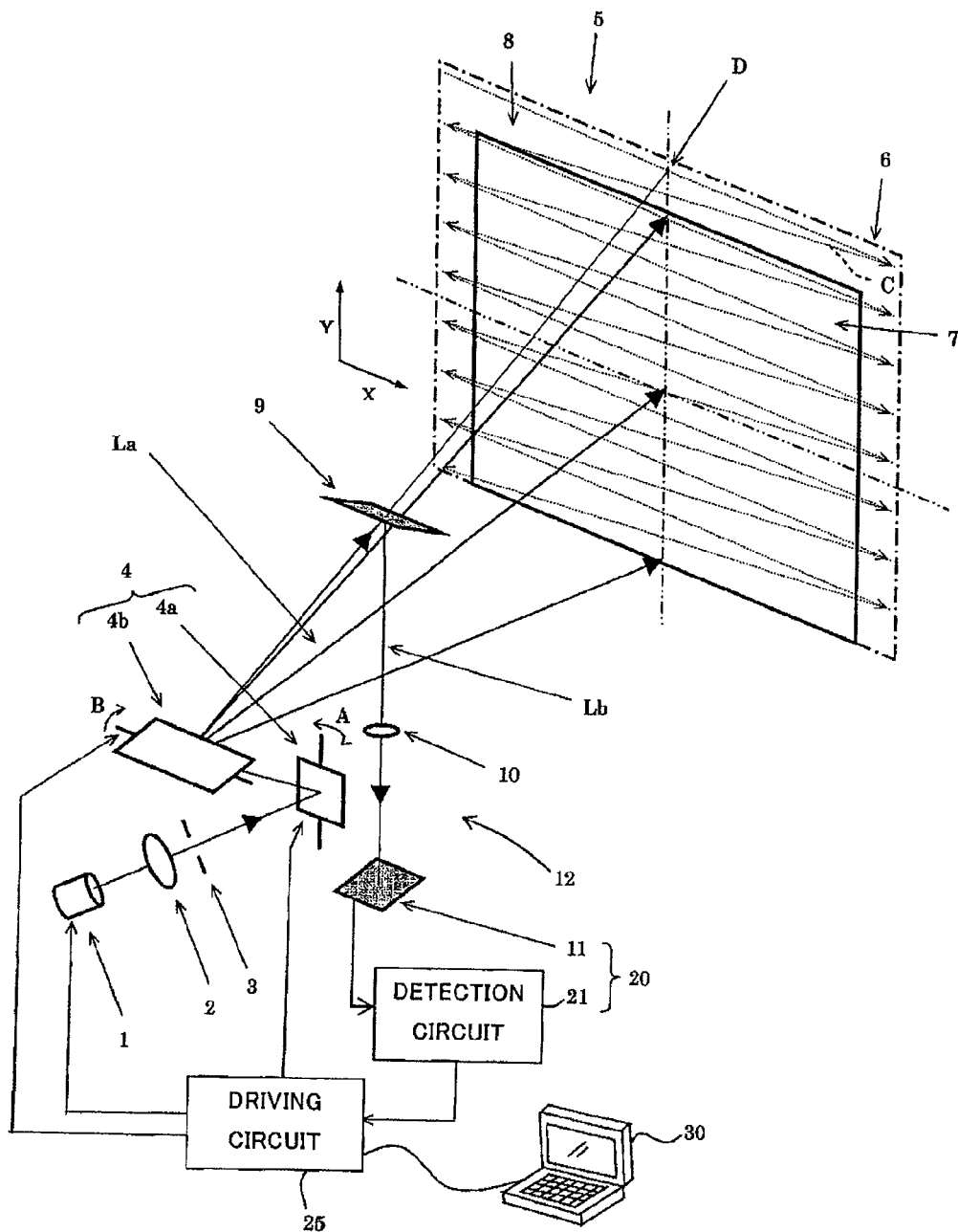
FIG. 1 is a perspective view for describing a brief overview of a scanning type image display apparatus using a two-dimensional light scanning apparatus that is a first embodiment of the present invention.

FIG. 1 shows a brief overview of a two-dimensional scanning type image display apparatus that is a first embodiment of the present invention. The two-dimensional scanning type image display apparatus includes a two-dimensional light scanning apparatus 12 described below, as a main constituent element.

A light beam emitted from a semiconductor laser 1, which is a light source, proceeds through a collective lens 2 to an aperture stop 3 in which its light beam width is limited, and then enters a scanning unit 4. The scanning unit 4 is constituted by a horizontal scanning device 4a that deflects the entering light beam in a horizontal direction (x-direction), and a vertical scanning device 4b that deflects the entering light beam in a vertical direction (y-direction). The scanning unit 4 deflects (scans) the light beam from the semiconductor laser 1 two-dimensionally. A light beam La from the scanning unit 4 forms a spot image on a screen 5 which is a scanned surface. When the light beam La is scanned, the spot image is moved two-dimensionally.

In the embodiment, a MEMS mirror that is resonantly driven in a direction of an arrow A at a frequency of 20 kHz is used as the horizontal scanning device 4a, which performs reciprocating scanning of the light beam La in the horizontal direction. A galvanomirror that is intermittently driven for rotation in a direction of an arrow B at a frequency of 60 Hz is used as the vertical scanning device 4b, which scans the light beam La from top to bottom. In the embodiment, a fast scanning is performed in the horizontal direction, and a slow scanning is performed in the vertical direction. Thereby, as indicated by dotted arrows in the figure, a raster scanning is performed in which scanning lines reciprocate in the horizontal direction are formed.

Within a scanning area 6 indicated by a dashed line on the screen 5, there are an effective scan area 7 indicated by a solid line and a non-effective scan area 8 outside thereof. The effective scan area 7 is an image-forming area in which an image is formed by drawing 600 scanning lines, for example. On the other hand, the non-effective scan area 8 is a non-image-forming area in which the light beam La is scanned but no image is formed.

In a state in which the light beam La is scanned in the non-effective scan area 8, synchronous detection is performed. The synchronous detection used herein refers to detection of a scanning position of the light beam La in the horizontal direction (second direction), and is performed to match image-drawing positions in the reciprocating scanning with good accuracy. Further, the matching of the image-drawing positions in the reciprocating scanning enables aligning of image-drawing start positions.

The MEMS mirror used as the horizontal scanning device 4a is resonantly driven, so that its angular velocity is fastest in the vicinity of the amplitude center of the mirror and slowest in the vicinity of the maximum amplitude (maximum deflection angle). To detect the scanning position in the horizontal direction with good accuracy, it is desirable to perform the detection in the vicinity of the center of an image in the horizontal direction, in which the angular velocity of the light beam La scanned by the horizontal scanning device 4a is fast. Therefore, in this embodiment, in a state in which the light beam La is scanned in the non-effective scan area 8 existing above the effective scan area 7 (that is, the light beam La proceeds toward the non-effective scan area 8), the synchronous detection is performed at a center point D in the horizontal direction.

In a state where the light beam La proceeds toward the center point D of the non-effective scan area 8 in the horizontal direction, part of the light beam La is reflected downwardly (in the vertical direction which is a first direction) by a light-detecting mirror 9 as a light-introducing member including a reflection surface, which results in being a detection light Lb. The detection light Lb passes through a light-detecting lens 10 to form a spot image on an area sensor 11 that constitutes a synchronous detector 20 as a light detector. The light-detecting lens 10 forms an optically conjugate relationship between the light source (semiconductor laser 1) and the light-receiving surface of the area sensor 11.

The area sensor 11 picks up the spot image, and outputs its image-pickup data. A detection circuit 21 calculates a luminance-barycentric position based on a luminance distribution in the image-pickup data (output signal) from the area sensor 11 to detect the scanning position of the light beam La in the horizontal direction. More specifically, the semiconductor laser 1 is caused to emit a light beam at specific timings in forward and backward paths of the horizontal reciprocating scanning to create the spot image, thereby detecting the scanning positions in the respective paths.

A drive circuit 25 adjusts light-emitting timings of the semiconductor laser 1 in accordance with a shift amount of the scanning positions, obtained in the forward and backward paths, to match the image-drawing positions in the reciprocating scanning with good accuracy. That is, the drive circuit 25 synchronizes the resonance drive of the horizontal scanning device 4a with the light-emitting timings of the semiconductor laser 1 at the scanning center position in the horizontal direction, thereby aligning the image-drawing start positions by the reciprocating scanning.

The drive circuit 25 is connected with an image supplying apparatus 30 such as a personal computer, a DVD player, and a television tuner. The drive circuit 25 modulates the semiconductor laser 1 in accordance with image information input from the image supplying apparatus 30. Thereby, an image corresponding to the input image information is displayed on the effective scan area 7. An image display system is constituted by the scanning type image display apparatus of this embodiment and the image supplying apparatus 30.

Figure 2:
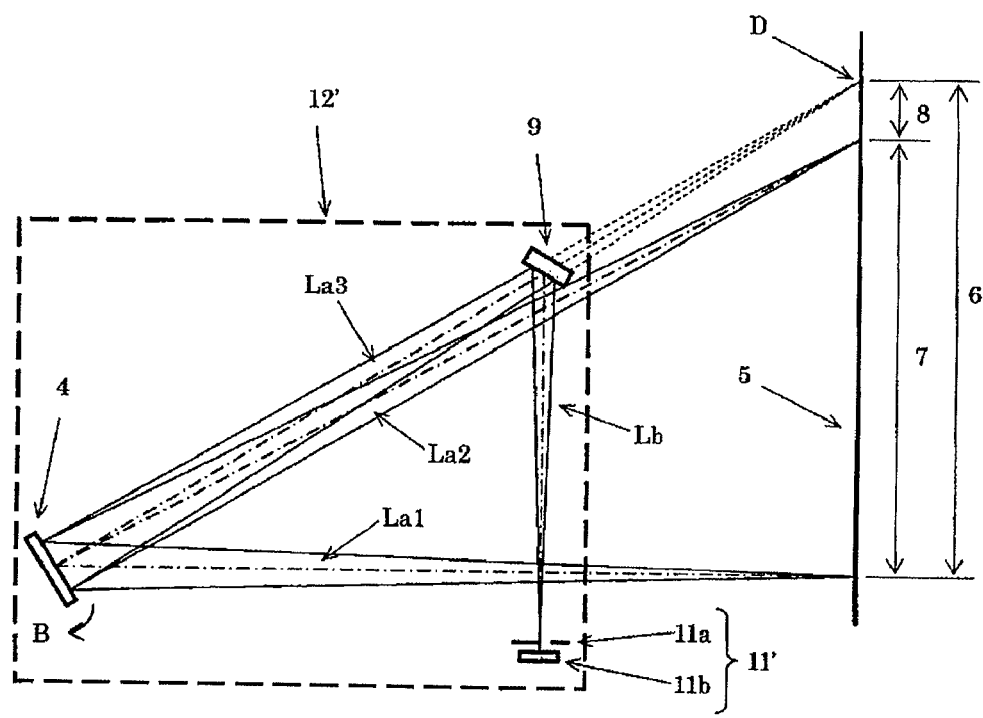
FIG. 2 is a vertical cross-sectional view of the light scanning apparatus that is a first comparative example.

FIG. 2 shows a vertical cross-section of a light scanning apparatus 12' that is a first comparative example for the embodiment. In FIG. 2, the constituent elements common to those shown in FIG. 1 are designated by the same reference numerals in FIG. 1.

FIG. 2 schematically shows a state in which the light beam La reflected and deflected by the scanning unit 4 is scanned on the screen (scanned surface) 5, and a state in which the light beam La is introduced to a synchronous detector 11'.

La1 shows a state in which the light beam La reaches a lower end of the effective scan area 7 on the scanned surface 5. La2 shows a state in which the light beam La reaches an upper end of the effective scan area 7. La3 shows a state in which the light beam La proceeds toward the non-effective scan area 8 above the effective scan area 7. Thus, La1, La2, and La3 show states of the light beam La at different timings. In the description below, the light beam La in each of the states is referred to as a light beam La1, a light beam La2, and a light beam La3.

Since the light beam La3 is introduced to the synchronous detector 11', it does not reach the non-effective scan area 8 in reality. FIG. 2 shows by a dotted line an optical path that would be formed when no light-detecting mirror 9 is provided.

The light scanning apparatus in the first comparative example performs the synchronous detection in a state that the light beam La3 proceeds toward the center point D of the non-effective scan area 8 in the horizontal direction. Therefore, the light-detecting mirror 9 is disposed on the optical path of the light beam La3 to reflect the light beam La3 downwardly, and introduces the reflected light beam La3 as the detection light Lb to the synchronous detector 11'. The synchronous detector 11' differs from the area sensor 11 shown in FIG. 1 in that it is constituted by a slit 11a and a light-receiving element 11b. The slit 11a is disposed at a position equivalent to the center point D in the horizontal direction. A light beam that passes through the slit 11a when a spot of the detection light Lb crosses on the slit 11a is received by the light-receiving element 11b. A timing at which the amount of the light beam received by the light-receiving element 10b exceeds a threshold value is detected.

At this time, the shielding of the light beam La2 that reaches the effective scan area 7 is not allowed. Thus, in a proceeding direction of the light beam La3, there is a need of disposing the light-detecting mirror 9 at a position where the light beam La3 does not overlap an optical path of the light beam La2 proceeding toward the effective scan area 7. However, in order that the light beam La3 exiting from the scanning unit 4 does not completely overlap the optical path of the light beam La2, the light-detecting mirror 9 needs to be disposed closer to the scanning area 6 (screen 5) than to the scanning unit 4. The arrangement like this increases the size of the light scanning apparatus 12'.

Figure 3:
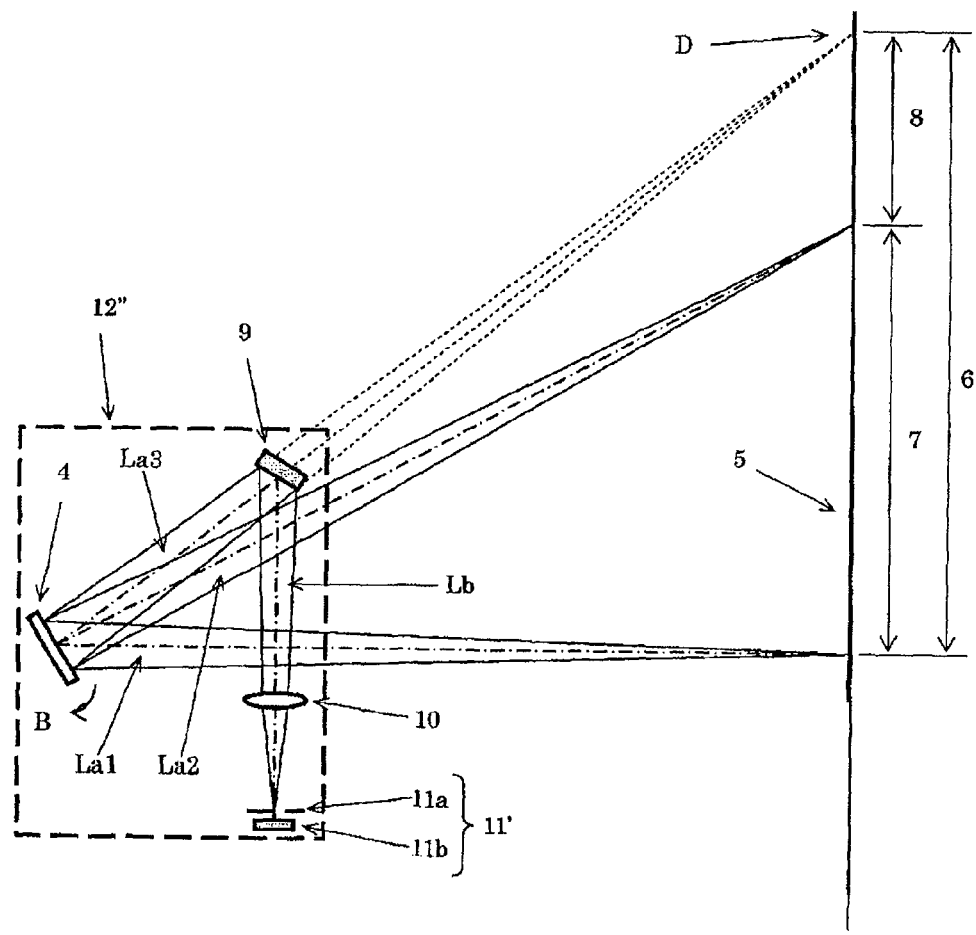
FIG. 3 is a vertical cross-sectional view of the light scanning apparatus that is a second comparative example.

FIG. 3 shows a vertical cross-section of a light scanning apparatus 12" that is a second comparative example for the embodiment. In FIG. 3, the constituent elements common to those shown in FIG. 2 are designated by the same reference numerals in FIG. 2.

FIG. 3 also schematically shows a state in which the light beam La reflected and deflected by the scanning unit 4 is scanned on the screen (scanned surface) 5, and a state in which the light beam La is introduced to the synchronous detector 11'.

In the second comparative example, the light-detecting mirror 9 is disposed closer to the scanning unit 4, as compared to the first comparative example. This arrangement reduces the size of the light scanning apparatus 12".

However, even in the second comparative example, in the proceeding direction of the light beam La3, the light-detecting mirror 9 is also disposed at a position where the light beam La3 does not overlap the optical path of the light beam La2 proceeding toward the effective scan area 7. Thus, in the second comparative example, the maximum deflection angle of the scanning unit (vertical scanning device) 4 is made large, as compared to the first comparative example, to increase the deflection angle formed by the light beam La3 relative to the optical path of the light beam La2.

In this case, the light-detecting mirror 9 can be disposed closer to the scanning unit 4 as described above. However, the size of the effective scan area 7 remains unchanged, and thus the non-effective scan area 8 only is expanded, which significantly deteriorates scanning efficiency. For example, while the scanning efficiency in the first comparative example is 71%, that in the second comparative example decreases to 58%.

The scanning efficiency used herein refers to a ratio in time of the effective scan area 7 relative to one scanning period. In one scanning period, a scanning area occupies 80% and a flyback line occupies 20%. Further, the scanning area 6 is occupied by the effective scan area 7 and the non-effective scan area 8. That is, the following relationship is established:

Scanning efficiency=(effective scan area)/(non-effective scan area+flyback line).

When the scanning efficiency is thus deteriorated, the power of the light source per unit time cannot be fully utilized, and a displayed image becomes dark. Further, in the scanning unit 4, it is needed to increase the maximum deflection angle, and thus the drive thereof may become unstable.

Therefore, this embodiment reduces the size of the light scanning apparatus 12 while solving the problems inherent in the first and second comparative examples.

Figure 4A:
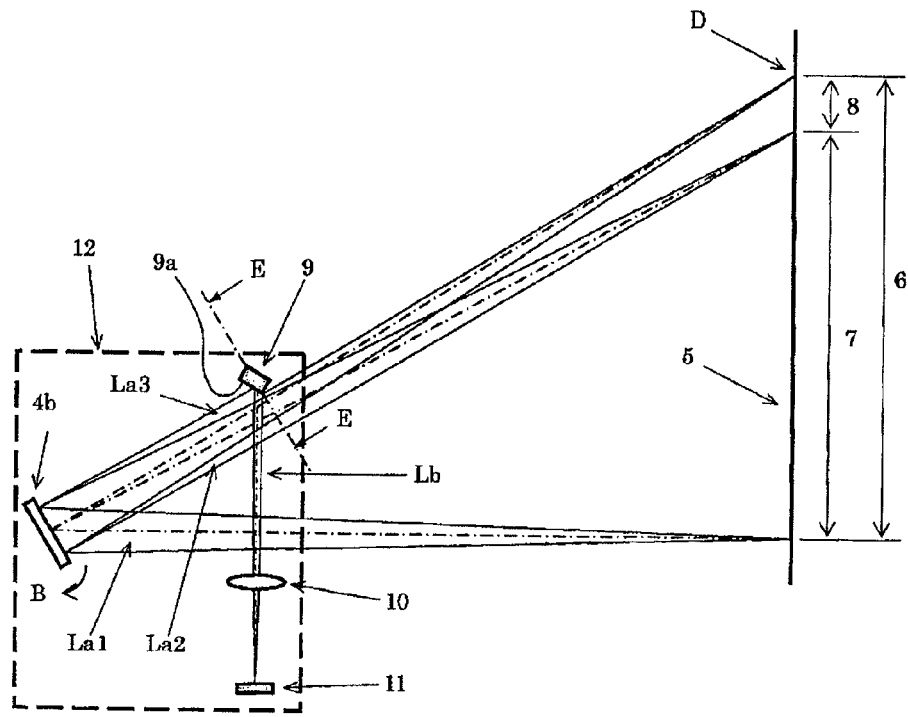
FIG. 4A is a vertical cross-sectional view of the light scanning apparatus of the first embodiment.

FIG. 4A shows a vertical cross-section of the light scanning apparatus 12 in this embodiment. The light beam La1 shows a state in which the light beam La scanned by the scanning unit 4 (vertical scanning device 4b) reaches a lower end of the effective scan area 7 on the screen 5. The light beam La2 shows a state in which the light beam La reaches an upper end of the effective scan area 7. The light beam La3 shows a state in which the light beam La proceeds toward (reaches) the non-effective scan area 8 existing in the upper portion of the scanning area 6.

The light-detecting mirror 9 is disposed in the optical path of the light beam La3, and its reflection surface 9a reflects the light beam La3 toward the area sensor 11.

Figure 4B:
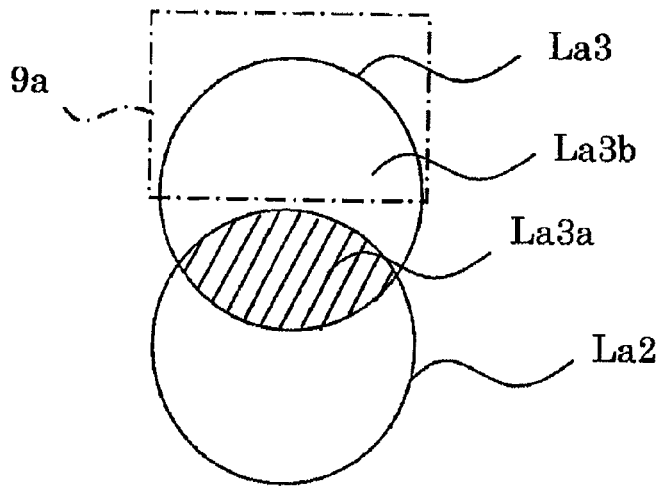
FIG. 4B is a cross-sectional view along a line E-E in FIG. 4A.

The light-detecting mirror 9 is disposed, in a proceeding direction of the light beam La3, at a position where the light beam La3 within its light beam width (light beam cross-section) includes a portion that overlaps the optical path of the light beam La2 and a portion that does not overlap the same. FIG. 4B shows a cross-section of the light beam cut along a line E-E of FIG. 4A. In this figure, La3a shows an overlapping portion of the light beam La3 with the optical path of the light beam La2, and La3b shows a non-overlapping portion therewith.

The light-detecting mirror 9 is disposed such that only a light beam component of the non-overlapping portion La3b among the light beam La3 (that is, a partial light beam component within the light beam width of the light beam La3) is reflected by the reflection surface 9a.

The light-detecting mirror 9 (reflection surface 9a) has a width (height) slightly larger than that of the non-overlapping portion La3b in the vertical cross-section. The reason for this is to utilize the light beam component as the detection light Lb as much as possible among the light beam La3.

The detection light Lb which is the partial light beam component among the light beam La3 reflected by the light-detecting mirror 9 passes through the light-detecting lens 10 to form a spot image on the area sensor 11. As described above, the scanning position of the light beam La in the horizontal direction is detected based on the image-pickup data of the spot image from the area sensor 11.

In the embodiment, to detect the scanning position of the light beam La in the horizontal direction by using the area sensor 11, the detection light Lb is reflected in the vertical direction by the light-detecting mirror 9 to be introduced to the area sensor 11. Thereby, the detection light Lb intersects with the optical path of the light beam La2 to be introduced to the area sensor 11.

Herein, as described above, when the partial light beam component (detection light Lb) of the portion La3b that does not overlap the optical path of the light beam La2 among the light beam La3 is extracted by the light-detecting mirror 9, the detection light Lb has the light beam width narrow only in the vertical direction, but the diameter of the spot formed on the area sensor 11 (spot diameter) in the horizontal direction remains unchanged. Therefore, there is no problem in evaluating a barycentric position of the spot in the horizontal direction, and thus the scanning position can be detected with sufficiently good accuracy.

In particular, in this embodiment, the area sensor 11 is used as the synchronous detector 20 to evaluate the barycentric position of the spot from the luminance distribution of the picked-up spot image. Thus, the present embodiment is not easily influenced by a decrease in peak light amount caused due to the spot diameter becoming large or the light beam width becoming narrow.

That is, even when the detection light Lb is a partial light beam component within the light beam width of the light beam La3, the scanning position of the light beam La can be accurately detected. The use of the area sensor 11 as the light detection reduces the influence of a decrease in light amount, which results in a constantly stable light detection.

A light beam component not extracted by the light-detecting mirror 9 among the light beam La3 reaches the non-effective scan area 8. This light beam component, however, does not form an image in the non-effective scan area 8, so that the quality of the displayed image is not affected.

As described above, in this embodiment, at the position where part within the light beam width of the light beam La3 proceeding toward the non-effective scan area 8 overlaps the optical path of the light beam La2 proceeding toward the effective scan area 7, the light beam component (partial light beam component) of the portion that does not overlap the optical path of the light beam La2 is extracted by the light-detecting mirror 9 as the detection light Lb. Thereby, as compared to the first comparative example, the light-detecting mirror 9 can be disposed closer to the scanning unit 4, thus enabling miniaturization of the light scanning apparatus 12.

Further, in this embodiment, unlike the second comparative example, there is no need of increasing the deflection angle of the light beam La3 by the scanning unit 4. As a result, the scanning efficiency can be enhanced. The scanning efficiency of this embodiment is 71%, which is as high as that of the first comparative example.

Further, in this embodiment, the use of the area sensor 11 for the light detection (synchronous detection) enables scanning position detection of the light beam La with good accuracy for the light beam La3, even by the detection light Lb whose light beam width is narrow.

This enables achieving of a light scanning apparatus and a scanning type image display apparatus which have a high scanning efficiency and a high scanning position detection accuracy while being small in size.

In particular, when the semiconductor laser is used as the light source, its output cannot be set so high. However, an increase of the scanning efficiency enables a higher ratio of a light-emitting time of the semiconductor laser in a one-frame image, thereby allowing a bright image to be displayed.

Second Embodiment

Figure 5A:
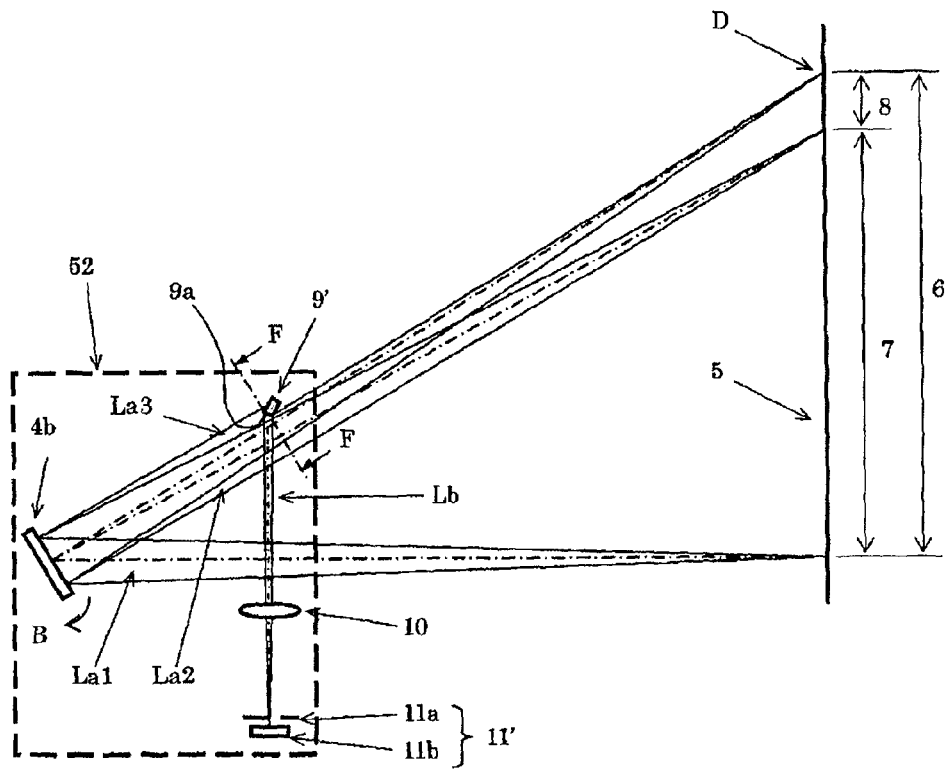
FIG. 5A is a vertical cross-sectional view of a two-dimensional light scanning apparatus that is a second embodiment of the present invention.

FIG. 5A shows a vertical cross-section of a two-dimensional light scanning apparatus that is a second embodiment of the present invention. A light scanning apparatus 52 is used as the main constituent element of the scanning type image display apparatus, similar to the first embodiment.

Figure 5B:
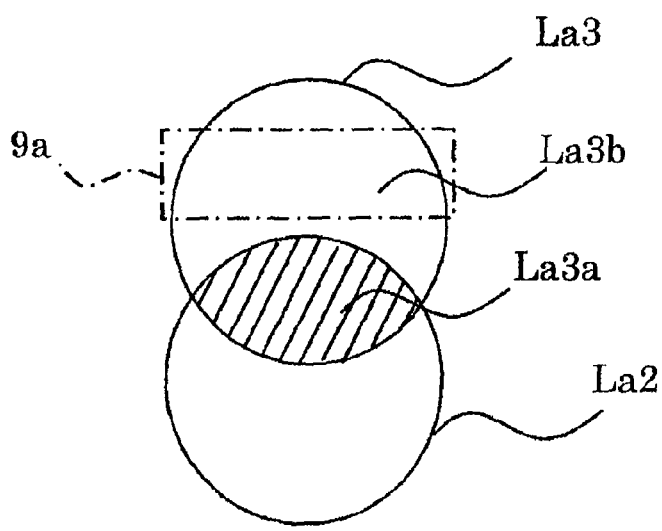
FIG. 5B is a cross-sectional view along a line F-F in FIG. 5A.

The light scanning apparatus 52 is the same as that in the first embodiment in that the light beam La is scanned by the scanning unit 4 (in the figure, the vertical scanning device 4b only is shown) to form the image in the effective scan area 7, and a partial light beam component (detection light Lb) within the light beam width of the light beam La3 proceeding toward the non-effective scan area 8 is extracted by the light-detecting mirror 9 to be used for the synchronous detection. In the embodiment, the constituent elements the same or having the same functions as those in the first embodiment are designated by the same reference numerals as in the first embodiment. FIG. 5B shows a cross-section cut along a line F-F in FIG. 5A.

As described in detail in FIG. 5B, this embodiment differs from the first embodiment in that, in the vertical cross-section, the width (height) of the reflection surface 9a (surface on which the light beam La impinges) of the light-detecting mirror 9 is made smaller than the width of the portion La3b that does not overlap the optical path of the light beam La2 within the light beam width of the light beam La3. Further, this embodiment differs from the first embodiment in that the synchronous detector 11' is constituted by the slit 11a and the light-receiving element 11b, similar to the above-described comparative examples.

Figure 6:
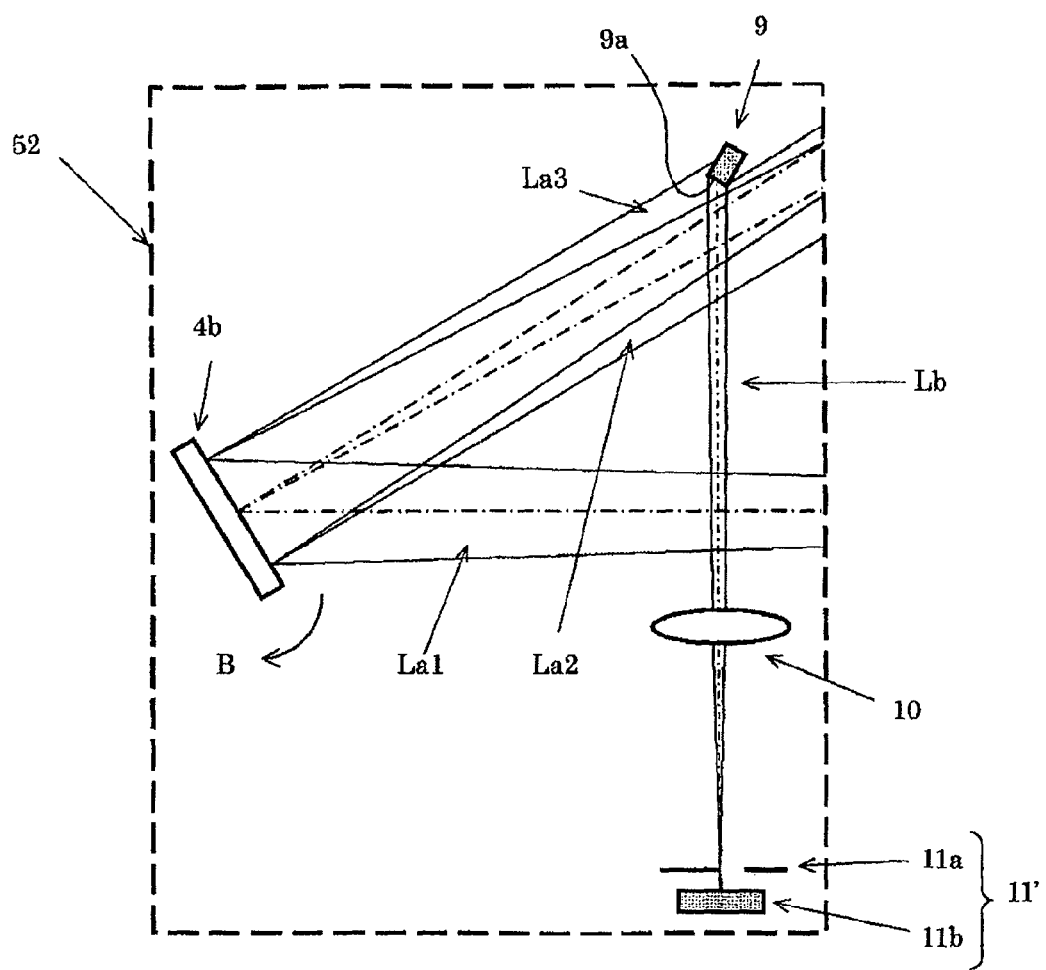
FIG. 6 is an enlarged view of a vertical cross-section of the light scanning apparatus of the second embodiment.

FIG. 6 enlargedly shows the vertical cross-section of the light scanning apparatus 52 of this embodiment. Herein, when only a partial light beam component within the light beam width of the light beam La3 is reflected by the light-detecting mirror 9 to be introduced to the synchronous detector 11', a positional relationship between the light-detecting mirror 9 (reflection surface 9a) and the light beam La3 is important.

In the embodiment, when the light-detecting mirror 9 including a relatively large reflection surface 9a is used as in the first embodiment, if a mounting position of the light-detecting mirror 9 within the apparatus is shifted, the light beam width of the detection light Lb extracted from the light beam La3 changes. That is, the amount of light that reaches onto the synchronous detector 11' changes. Thereby, the amount of light received by the light-receiving element 11b changes, and as a result, a time taken from the spot starts passing through the slit 11a until the amount of receiving light reaches a threshold value changes. This results in an error occurring in detection of the scanning timing. Further, to avoid this, the threshold value needs to be reset.

Therefore, this embodiment uses the light-detecting mirror 9 including a reflection surface 9a whose width is smaller than that of the portion La3b that does not overlap the optical path of the light beam La2 within the light beam width of the light beam La3 in the vertical cross-section.

As a result, the light beam width of the detection light Lb is determined by the width of the reflection surface 9a of the light-detecting mirror 9. Thus, even when a certain amount of shift (error) occurs in the mounting position of the light-detecting mirror 9, the detection light Lb of a constant light amount can be introduced to the synchronous detector 11'. Therefore, the scanning timing can be stably detected while the threshold value of the amount of light received by the light-receiving element 11b is fixed. That is, synchronous detection with good accuracy can be performed.

Further, since the light-detecting mirror 9 is made smaller, the light scanning apparatus 52 can be miniaturized further than that of the first embodiment.

Conventionally, an ND filter as a light-amount attenuating means is provided before the light-detecting lens 10 to adjust the amount of entering light such that the light amount corresponds to the sensitivity of the light-receiving element 11b. However, the use of the light-detecting mirror 9 in this embodiment enables setting of the width of the reflection surface 9a of the light-detecting mirror 9 such that the amount of light reaching the light-receiving element 11b becomes a desired value. These features eliminate the ND filter. That is, the light-detecting mirror in this embodiment can also serve a function as the light-amount attenuating means like the ND filter. As a result, the number of constituent components of the light scanning apparatus can be reduced.

Third Embodiment

Figure 7:
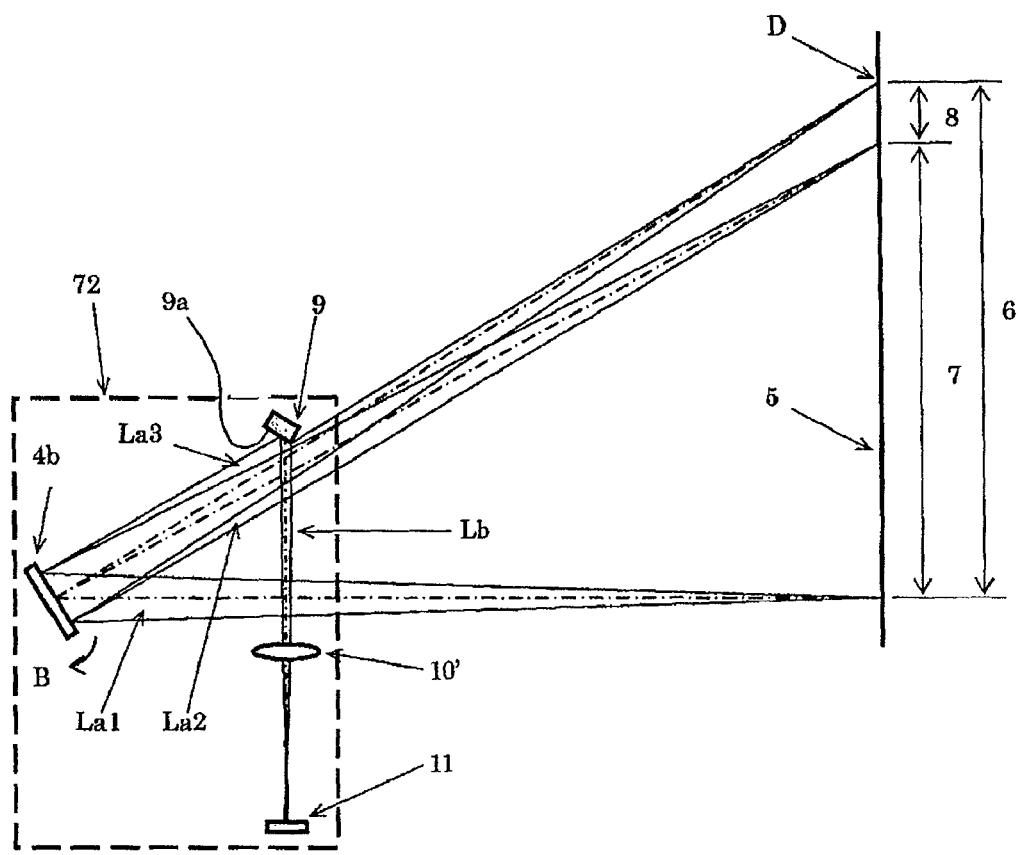
FIG. 7 is a vertical cross-sectional view of a two-dimensional light scanning apparatus that is a third embodiment of the present invention.

FIG. 7 shows a vertical cross-section of a two-dimensional light scanning apparatus that is a third embodiment of the present invention. A light scanning apparatus 72 is also used as the main constituent element of the scanning type image display apparatus, similar to the first embodiment. The light scanning apparatus 72 is the same as that in the first embodiment in that the light beam La is scanned by the scanning unit 4 (the vertical scanning device 4b only is shown in the figure) to form an image in the effective scan area 7, and the partial light beam component (detection light Lb) within the light beam width of the light beam La3 proceeding toward the non-effective scan area 8 is extracted by the light-detecting mirror 9 and the synchronous detection is performed by using the area sensor 11. In this embodiment, the constituent elements the same or having the same functions as those in the first embodiment are designated by the same reference numerals as in the first embodiment.

In this embodiment, the light scanning apparatus 72 differs from the first embodiment in that, in the vertical cross-section (first direction), the light-detecting mirror 9 and the area sensor 11 have an optically conjugate relationship.

Figure 8:
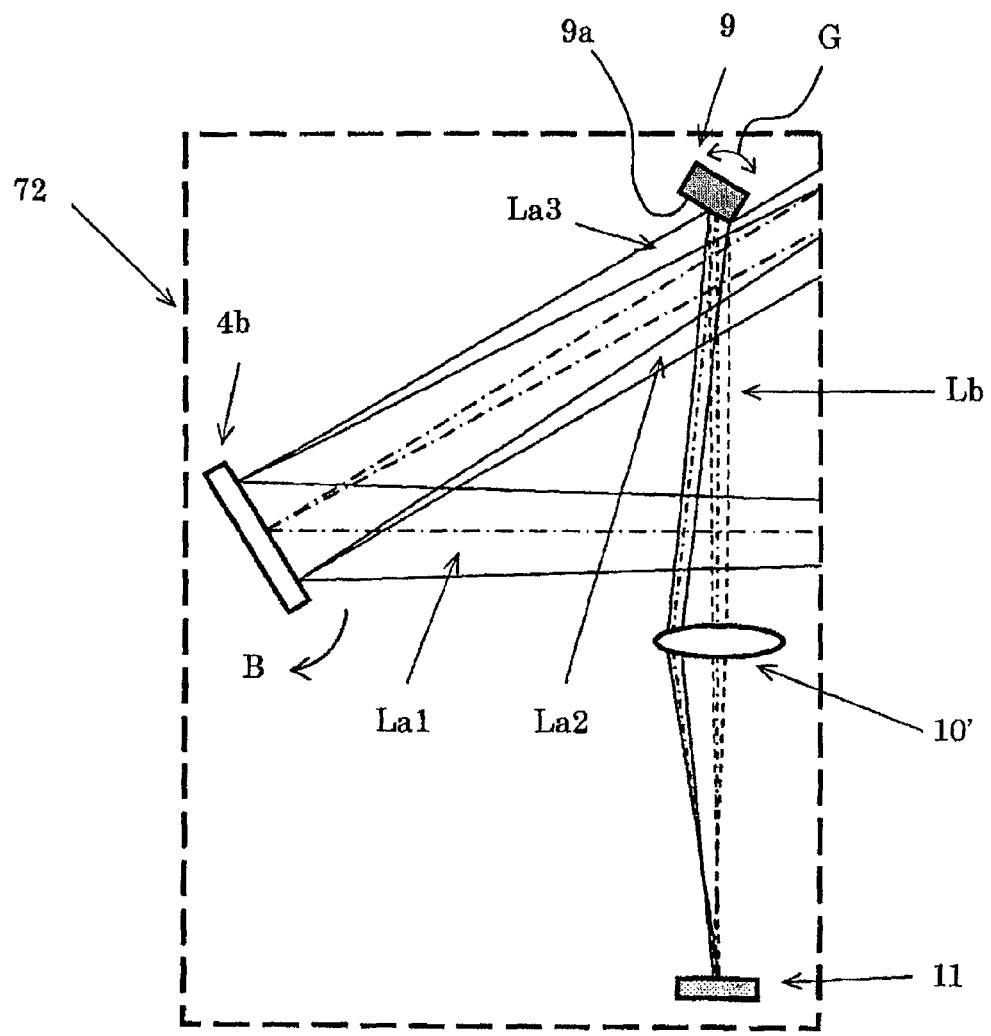
FIG. 8 is an enlarged view of a vertical cross-section of the light scanning apparatus of the third embodiment.

FIG. 8 enlargedly shows the vertical cross-section of the light scanning apparatus of this embodiment. When there is an error in a mounting angle (inclination) of the light-detecting mirror 9 as indicated by an arrow G in FIG. 8, the spot of the detection light Lb shifts from the area sensor 11, and thus the synchronous detection may not be performed in the first embodiment. In particular, when the light-detecting mirror 9 is inclined in the vertical cross-section, even if the light-emitting timing of the semiconductor laser 1 is changed, the detection light Lb may not be introduced to the area sensor 11.

Therefore, in this embodiment, a light-detecting lens (light-detection optical system) 10' has a function of optically conjugating the reflection surface 9a of the light-detecting mirror 9 and a light-receiving surface of the area sensor 11 in the vertical cross-section. Thereby, even when the mounting error inclines the light-detecting mirror 9, the detection light Lb can be constantly introduced to the area sensor 11.

In this embodiment, the light-detecting lens 10' is constituted by a single anamorphic lens whose focal length in the vertical direction is shorter than that in the horizontal direction.

Herein, fx represents the focal length of the light-detecting lens 10' in the horizontal direction, and fy represents the focal length in the vertical direction. Further, d1 represents the length from the reflection surface 9a of the light-detecting mirror 9 to the light-detecting lens 10', and d2 represents the length from the light-detecting lens 10' to the light-receiving surface of the area sensor 11. In this case, a relationship that satisfies the following expression is established:

$$fy < fx$$

$$0.95 \leq \frac{d1 \times d2}{d1 - d2} \times \frac{1}{fy} \leq 1.05$$

When the length from the scanning unit 4 to the screen (scanned surface) 5 is long, the setting may be employed so that the following expression is satisfied:

$$fy < fx$$

$$0.95 \leq \frac{d1 \times fx}{d1 - fx} \times \frac{1}{fy} \leq 1.05$$

Thus, the light-detecting lens 10' of this embodiment forms the optically conjugate relationship between the reflection surface 9a of the light-detecting mirror 9 and the light-receiving surface of the area sensor 11 only in the vertical cross-section, and forms a spot image of the detection light Lb on the area sensor 11 in the horizontal direction.

This enables detection of the scanning position of the light beam La in the horizontal direction, and constant introduction of the detection light Lb to the same position on the light-receiving surface of the area sensor 11 in the vertical direction even when the light-detecting mirror 9 is inclined due to the mounting error. That is, an influence caused by the inclination error of the light-detecting mirror 9 is eliminated, and thus a stable light detection can be performed.

In this embodiment, the width of the spot on the area sensor 11 is larger in the vertical direction, as compared to the first embodiment. However, there is no change in the spot diameter in the horizontal direction, and thus the small spot diameter remains unchanged. Therefore, the scanning position in the horizontal direction can be detected with good accuracy.

In this embodiment, as in the second embodiment, the use of the light-detecting mirror 9 with a small width of the reflection surface in the vertical direction enables narrowing of the light beam width in the vertical direction to a certain degree.

According to each of the embodiments, the partial light beam component within the light beam width of the light beam proceeding toward outside the effective scan area is extracted by the light-introducing member as the detection light. This enables the light-introducing member to be disposed closer to the scanner (scanning device) and miniaturized as well, as compared to a case where the light beam component of the entire light beam width of the light beam proceeding toward outside the effective scan area is used as the detection light. As a result, the light scanning apparatus and the scanning type image display apparatus provided therewith can be miniaturized.

Further, providing the light-introducing member close to the scanner enables narrowing of an area (non-effective scan area) outside the effective scan area. As a result, the scanning efficiency can be enhanced, and the illuminance of an image surface can be brighter. Further, since the maximum deflection of the light beam by the scanner can be made small, the scanner can be stably driven.

The use of the light scanning apparatus enables achieving of a scanning type image display apparatus which is capable of displaying a bright image while being small in size.

Moreover, according to each of the embodiments, the optically conjugate relationship is formed between the light-introducing member and the light detector. Therefore, even when there is an error in position, posture, or the like, of the light-introducing member, a stable light detection can be performed. The use of the light scanning apparatus enables achieving of a scanning type image display apparatus capable of displaying an image with good quality.

In each of the above embodiments, description was given of a case where the light beam is scanned two-dimensionally to form a two-dimensional image. However, the present invention is applicable to an apparatus that one-dimensionally scans the light beam.

In each of the embodiments, description was given of a case where a single semiconductor laser is used as the light source. However, the number of light sources may be plural. For example, three light sources, each of which emits a red light, a green light, and a blue light, may be used to constitute a scanning type image display apparatus that displays a full-color image.

In addition, the light source is not limited to the semiconductor laser, and other light sources such as a surface emitting laser, an LED, and an EELED (Edge-Emitting Light Emitting Diode) may be used.

In each of the embodiments, description was given of a case where a mirror is used as a light-introducing member that extracts the detection light Lb from the light beam La3. However, in alternative embodiments of the present invention, optical elements such as a prism including a reflection surface may be used as a light-introducing member.

Further, in each of the embodiments, description was given of the light scanning apparatus used for a scanning type image display apparatus that displays an image on a screen, a wall, or the like. However, alternative embodiments of the present invention include a scanning type image display apparatus that forms an image before an eye or on a retina of a viewer.

Moreover, the embodiments of the preset invention are not limited to the image display apparatus but include various apparatuses that form an image on a scanned surface by scanning a light beam.

Furthermore, the present invention is not limited to these preferred embodiments and various variations and modifications may be made without departing from the scope of the present invention.

This application claims foreign priority benefits based on Japanese Patent Application No. 2006-227504, filed on Aug. 24, 2006, which is hereby incorporated by reference herein in its entirety as if fully set forth herein.

What is claimed is:

1. A light scanning apparatus, comprising:
   a scanner that scans a light beam from a light source two-dimensionally in first and second directions over an effective scan area to form an image in the effective scan area, wherein the scanner scans the light beam at a first scanning speed in the first direction and scans the light beam at a second speed slower than the first speed in the second direction which is different from the first direction;
   a light detector that detects light; and
   a light-introducing member which includes a reflection surface;
   wherein the light beam scanned by the scanner includes a first light beam which proceeds toward the effective scan area and a second light beam which proceeds toward outside the effective scan area,
   wherein the light-introducing member is positioned at a position where the second light beam includes within a width of the second light beam in a direction of the second direction an overlapping portion which overlaps an optical path of the first light beam and a non-overlapping portion which does not overlap the optical path of the first light beam, and
   wherein a partial light beam component of the second light beam in the non-overlapping portion is reflected by the reflection surface of the light-introducing member so as to introduce the partial light beam component to the light detector.

2. A light scanning apparatus according to claim 1, wherein the width of a surface on which the partial light beam component impinges in the light-introducing member is smaller than the width of the non-overlapping portion.

3. A light scanning apparatus according to claim 1, wherein the light-introducing member introduces the partial light beam component to the light detector such that an optical path of the partial light beam component proceeding toward the light deflector intersects with an optical path of the first light beam.

4. A light scanning apparatus according to claim 1, wherein the first and second directions are perpendicular,
   the light-introducing member introduces the partial light beam component to the light detector in the second direction, and
   the light detector detects a position of the light beam scanned by the scanner in the first direction.

5. A light scanning apparatus according to claim 1, further comprising
   a light-detection optical system that optically conjugates the light-introducing member with the light detector.

6. A light scanning apparatus according to claim 5, wherein the first and second directions are perpendicular
   the light-introducing member introduces the light beam to the light detector in the second direction, and
   the light detector detects a position of the light beam scanned by the scanner in the first direction.

7. A light scanning apparatus according to claim 6, wherein the light-detection optical system optically conjugates the light-introducing member with the light detector in the second direction.

8. A scanning type image display apparatus, comprising:
   a light source;
   a light scanning apparatus according to claim 1; and
   a drive circuit that drives the light scanning apparatus based on input image information and a signal from the light detector.

* * * * *